(12) United States Patent
Hattori et al.

(10) Patent No.: US 6,320,836 B1
(45) Date of Patent: Nov. 20, 2001

(54) APPARATUS FOR ENSURING OPERATIONAL CLEARANCE BETWEEN A ROTATING DISC TYPE MEDIUM AND A DISC CARTRIDGE ENCLOSING THE MEDIUM

(75) Inventors: Toshiyasu Hattori, Minamiashigara; Masateru Watanabe, Chigasaki, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/367,766

(22) Filed: Jan. 3, 1995

Related U.S. Application Data (63) Continuation of application No. 07/837,931, filed on Feb. 20, 1992, now abandoned.

(30) Foreign Application Priority Data

Mar. 4, 1991 (JP) .................................................. 3-037439

(51) Int. Cl.$^7$ .................................................. G11B 17/022
(52) U.S. Cl. ........................................ 369/77.2; 360/99.05
(58) Field of Search ............................. 360/97.01, 99.01, 360/99.02, 99.06, 99.12, 133, 96.5, 99.05; 369/77.1, 77.2, 75.1

(56) References Cited

U.S. PATENT DOCUMENTS

| 3,593,327 | * | 7/1971 | Shill .................................... 360/99.06 |
| 4,439,850 | * | 3/1984 | Takahara et al. .................... 369/77.2 |
| 4,740,937 | * | 4/1988 | Watanabe ........................... 360/99.06 |
| 4,807,069 | * | 2/1989 | Okauchi et al. .................... 360/99.06 |
| 4,839,760 | * | 6/1989 | Yamada et al. ..................... 360/97.01 |
| 5,172,362 | * | 12/1992 | Hattori et al. ....................... 369/77.1 |

FOREIGN PATENT DOCUMENTS

| 58-108074 | | 6/1983 | (JP) . |
| 58203682 | | 11/1983 | (JP) . |
| 6190052 | | 6/1986 | (JP) . |
| 62-57158 | | 3/1987 | (JP) . |
| 62-142778 | | 9/1987 | (JP) . |
| 0165855 | * | 7/1986 | (JP) .................................... 369/77.1 |

* cited by examiner

Primary Examiner—Brian E. Miller
(74) Attorney, Agent, or Firm—Mattingly, Stanger & Malur, P.C.

(57) ABSTRACT

An apparatus for a disc type medium capable of performing smooth recording/reproducing operations while maintaining gaps between a cartridge and a disc type medium encased therein with a fixed accuracy. The cartridge is held and pressed between support members disposed on a base on which a disc driving spindle motor is mounted and a holder is moved down due to the biasing force of prestressed springs provided on the holder so that warping deformation of the cartridge is corrected. As a result, fixed gaps can be formed surely between an optical disc and the cartridge during operation, thereby making it possible to keep them out of contact with each other.

3 Claims, 5 Drawing Sheets

APPARATUS FOR ENSURING OPERATIONAL CLEARANCE BETWEEN A ROTATING DISC TYPE MEDIUM AND A DISC CARTRIDGE ENCLOSING THE MEDIUM

This is a continuation application of Ser. No. 07/837,931, filed Feb. 20, 1992 now abandoned.

BACKGROUND OF THE INVENTION

This invention relates to an apparatus for a disc type medium and a disc cartridge apparatus, and more particularly, to a technique which is successful for application to an optical disc drive and an optical disc cartridge which are to be used with a disc type recording medium set in a cartridge and the like.

As a measure for improvement of office management efficiency, it is known to use an apparatus for a disc type medium such as an optical disc drive in which data such as documents and images can be stored in a mass storage disc type recording medium and retrieved at high speed.

In the optical disc drive, an optical disc which serves as the recording medium is encased in a protective container such as a cartridge, and recording/reproducing of information is performed with the optical disc encased in the cartridge so as to protect the optical disc from dust contained in the working environment as well as to make the same serviceable in handling. Examples of techniques for loading the cartridge having an optical disc encased therein into the optical disc drive have been known as disclosed in Japanese Patent Unexamined Publication No. 58-203682 and Japanese Utility Model Unexamined Publication No. 61-90052. According to the former conventional technique, a clamp member is disposed to face a disc driving unit so as to cooperate with this disc driving unit to hold therebetween the disc at the position where information is recorded on and reproduced from the disc, thereby setting the disc accurately with respect to the disc driving unit. According to the latter conventional technique, an automatic cassette loading apparatus is disclosed by which loading of a cassette is performed automatically by a mechanism which contains a gearing.

SUMMARY OF THE INVENTION

An object of the present invention is to provide an apparatus for a disc type medium which is capable of smoothly rotating a disc type medium encased in a cartridge while maintaining gaps between the cartridge and the disc type medium encased therein with a fixed accuracy and without being affected by deformation of the cartridge, so as to smoothly perform recording and/or reproducing and, if necessary, erasing.

Another object of the present invention is to provide a disc cartridge apparatus which is capable of easily correcting deformation of a cartridge in which a disc type medium is encased, rotating smoothly the disc type medium during operation while it is encased in the cartridge, and performing normal recording/reproducing/erasing operations without being affected by deformation of the cartridge.

A representative embodiment of the invention disclosed in this application will be summarily and briefly described.

An apparatus for a disc type medium according to this invention is of the type that a disc type medium is used while encased in a cartridge, which apparatus comprises a reference surface with which a first main surface of the cartridge is brought into contact when the cartridge is located in a loading position where the disc type medium is rotated, and biasing means serving to apply a pressing force to a second main surface which faces the first main surface while in contact with the reference surface, so that the cartridge is held and pressed between the first and second main surfaces due to the force exerted by the biasing means.

According to an aspect of the present invention, the biasing means serving to press the second main surface of the cartridge is provided on a holder by which the cartridge is set in and removed from the loading position, and the reference surface with which the first main surface of the cartridge is brought into contact is fixed on a medium driving mechanism by which the disc type medium is to be driven.

According to another aspect of the present invention, the reference surface with which the first main surface of the cartridge is brought into contact is provided on the holder by which the cartridge is set in and removed from the loading position, and the biasing means serving to press the second main surface of the cartridge is disposed on the medium driving mechanism by which the disc type medium is to be driven.

A disc cartridge apparatus according to the present invention comprises a cartridge and a disc type medium which is to be used while encased in the cartridge, the cartridge consisting of a plurality of frame members engaged with each other as a fit structure.

According to the apparatus for a disc type medium of the present invention, the cartridge in which the disc type medium is encased is held and pressed between the first and second main surfaces by means of the reference surface and the biasing means at the loading position where recording/reproducing/erasing operations of the disc type medium are effected, so that deformation of the cartridge can be corrected so as to maintain the gaps between the inner wall surface of the cartridge and the disc type medium with a fixed accuracy. In consequence, at the loading position of the cartridge (the position where the disc is rotatably set for performing recording/reproducing/erasing operations), contact of the cartridge with the disc type medium attributable to deformation of the cartridge can be surely avoided, so that it is possible to rotate the disc type medium smoothly as it is encased in the cartridge without being affected by deformation of the cartridge, thereby making it possible to perform smooth recording/reproducing/erasing operations.

Further, according to the disc cartridge apparatus of the present invention, the cartridge in which the disc type medium is encased consists of a plurality of frame members engaged with each other as a fit structure so that it is more flexible as compared with, for example, a case in which the frame members are screwed to each other as a whole. In consequence, it becomes possible to easily correct deformation of the cartridge when it is used so that contact of the disc type medium with the cartridge attributable to deformation of the cartridge can be surely avoided during the use, thereby making it possible to perform the smooth recording/reproducing/erasing operations.

Neither of the aforementioned conventional techniques has referred to the mechanism for maintaining at fixed values the gaps between the inner wall surface of the cartridge and the disc encased therein at the loading position of the cartridge. For example, if the cartridge is deformed due to an irregularity in shape caused during its manufacturing process, distortion caused during its storage or the like, and the deformed cartridge is thus loaded, it is inevitable that the inner wall surface of the cartridge and the disc encased therein will be brought into sliding contact with each other, with the result that the rotating disc is damaged or the load applied when the disc is rotated is scattered, thus giving rise to a problem that the normal recording/ reproducing/erasing operations are hindered.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are provided for the purpose of illustrating the preferred and alternate embodiments of the invention only, and not for the purposes of limiting the same, and wherein.

DETAILED DESCRIPTION OF THE PREFERRED AND ALTERNATE EMBODIMENTS

Description will be given below in detail of an apparatus for a disc type medium, and a disc type recording medium according to an embodiment of the present invention with reference to the drawings.

Figure 1:
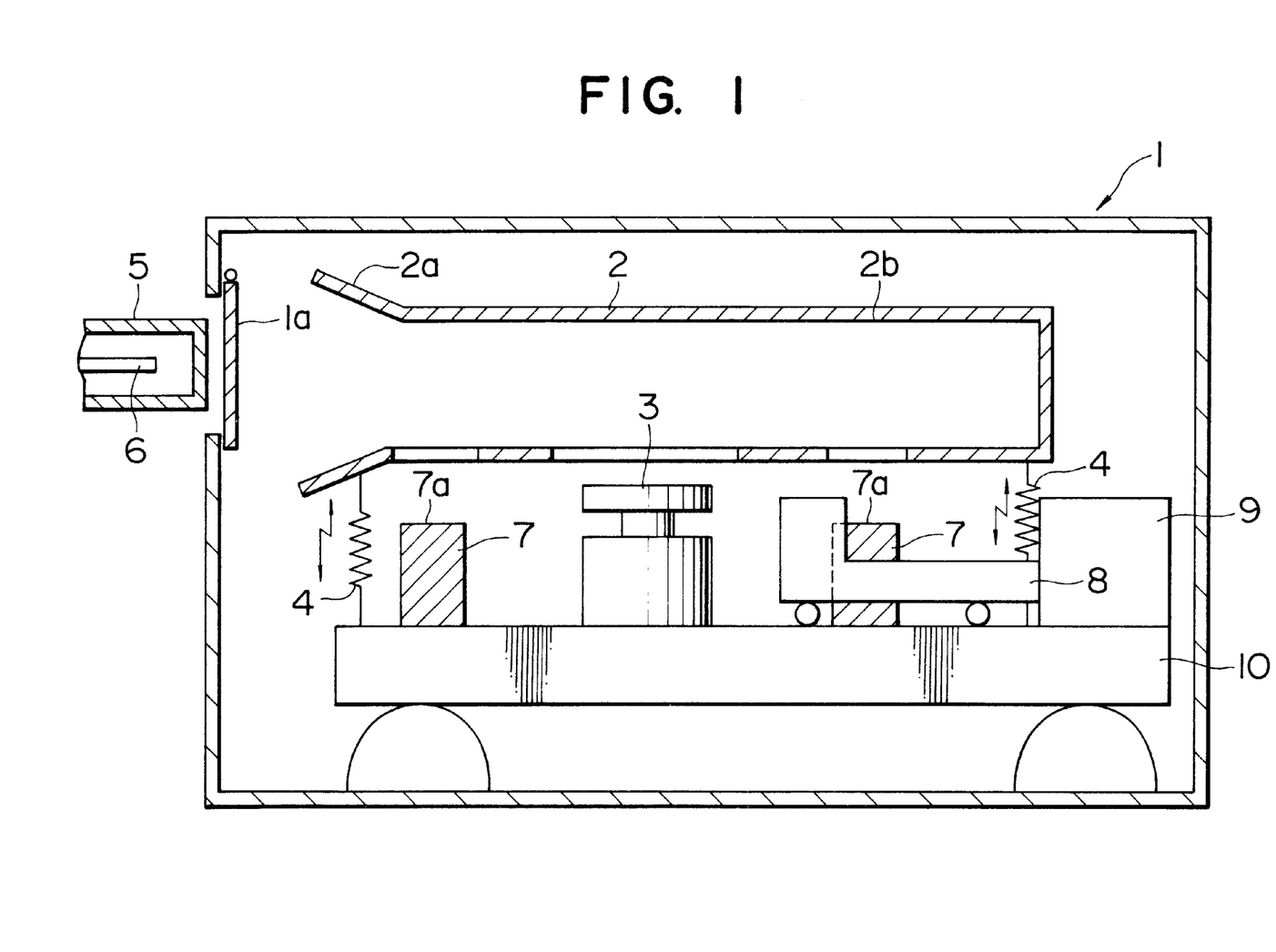
FIG. 1 is a schematic sectional view showing a construction of an apparatus for a disc type medium according to an embodiment of the present invention.

FIG. 1 is a schematic sectional view showing a construction of an apparatus for a disc type medium according to an embodiment of the present invention. In this embodiment, description will be given of an optical disc drive is as the apparatus.

Within a casing 1 of an optical disc drive is disposed a base 10, and a disc driving spindle motor 3 and an optical head 8 are mounted on the base 10. The optical head 8 is so designed as to be able to move toward and away from the disc driving spindle motor 3 (in the radial direction of an optical disc 6 set on the spindle motor 3) on the base 10 by means of a head driving motor 9.

Above the disc driving spindle motor 3 is disposed a holder 2 which is moved up and down by a driving mechanism which is not shown. The holder 2 has a reception port 2a formed on one side thereof facing a door 1a of the casing 1 so that a cartridge 5 having an optical disc 6 encased therein is inserted into the reception port 2a through the door 1a. The holder 2 serves to hold the optical disc 6 as it is encased in the cartridge 5 and to set the optical disc 6 on the disc driving spindle motor 3 via an aperture in the lower wall of holder 2 by lowering the cartridge 5, thus carrying out the loading operation. In the case of the unloading operation, the holder 2 serves to raise the cartridge 5 so as to bring it back to the insertion/ejection position.

Around the disc driving spindle motor 3 on the base 10 are disposed support members 7 each having a reference surface 7a intended for contact with the lower surface 5a (the first main surface, in this case) of the cartridge 5 at four corner portions via corresponding apertures in the lower wall of holder 2, for example, with the optical disc 6 encased therein. The height of the reference surface 7a is so determined as to ensure a prescribed distance $L_1$ between the reference surface 7a and the optical disc 6 set on the disc driving spindle motor 3 in position for rotation so that both sides of the optical disc 6 can be kept out of contact with the inner wall surface of the cartridge 5 when it is loaded. More specifically, the holder 2 is provided with a driving mechanism (not shown) for loading and unloading operations, and a plurality of prestressed springs 4 serving to exert forces to the cartridge 5 to bring it into intimate contact with the reference surfaces 7a of the support members 7. The spring constant of the prestressed springs 4 is so determined as to be sufficiently greater than the stiffness of the cartridge 5. In the case of the loading operation, the upper surface 5b (the second main surface, in this case) of the cartridge 5, which is restricted from lowering due to contact with the reference surfaces 7a of the support members 7, is brought into intimate contact with an upper inner wall surface 2b of the holder 2 which is moved down by the biasing force attributable to the prestressed springs 4, and the cartridge 5 is held and pressed between the reference surfaces 7a and the upper inner wall surface 2b of the holder 2 so that deformation thereof can be corrected. In consequence, the cartridge 5 can be surely kept out of contact with the optical disc 6 encased therein, with the result that it is possible to make the disc type recording medium rotate smoothly without being affected by the deformation of the cartridge as the disc type recording medium is encased in the cartridge.

Next, description will be given of an example of the function of the optical disc drive constructed as described above.

Figure 2:
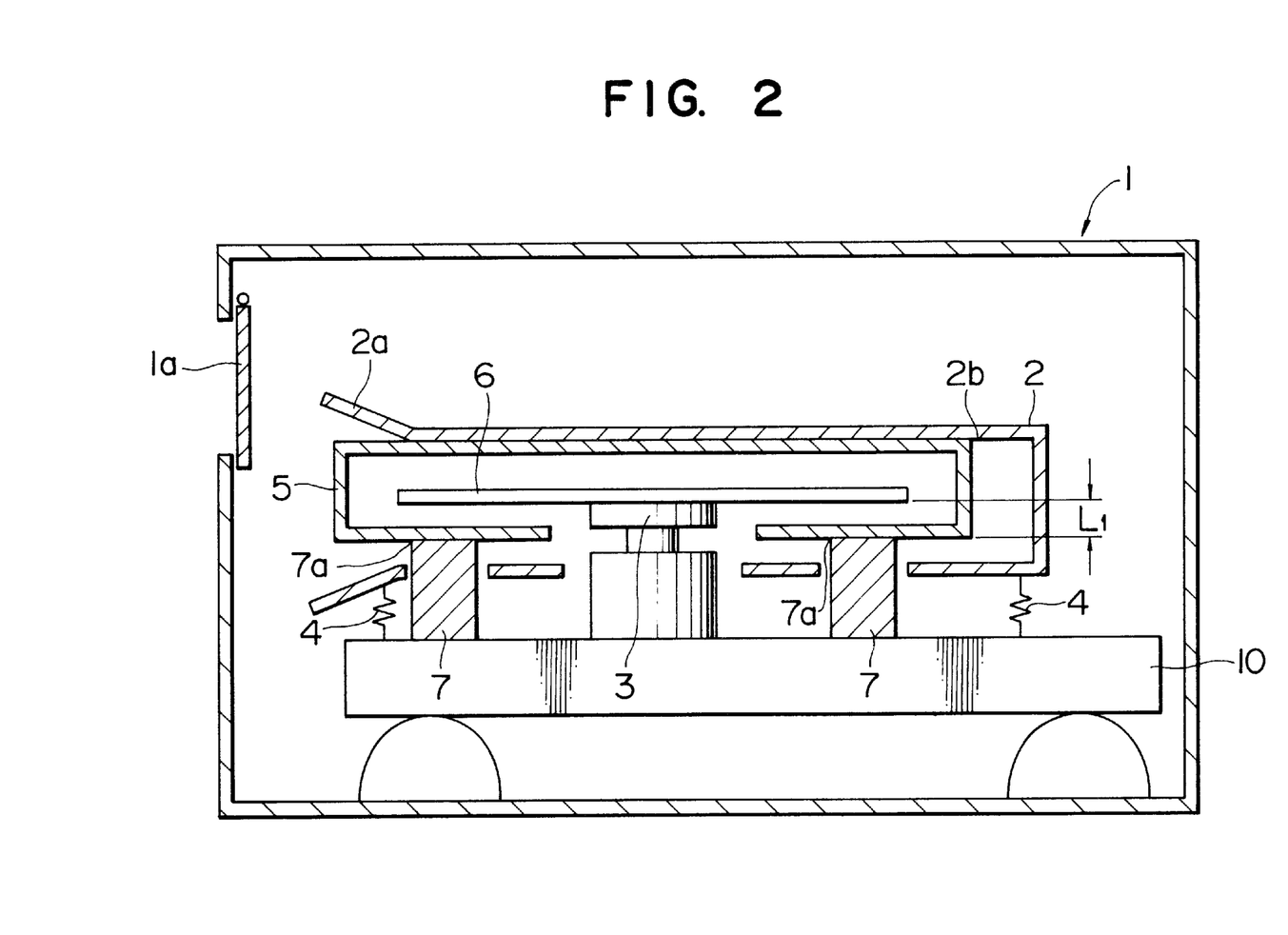
FIG. 2 is a schematic sectional view of the apparatus for the disc type medium according to an embodiment of the invention when it is in operation.

In the optical disc drive in the state where the cartridge 5 is not loaded as shown in FIG. 1, the holder 2 is raised as high as the door 1a of the casing 1. The cartridge 5 having the optical disc 6 encased therein is inserted, by an operator or an automatic loading mechanism, into the interior of the holder 2 through the door 1a of the casing 1 and through the reception port 2a of the holder 2. Then, the driving mechanism of the holder 2, which is not shown, operates to detect the insertion of the cartridge 5, lower the holder 2 down to the loading position, and set the optical disc 6 encased in the cartridge 5 on the disc driving spindle motor 3. At this time, in the case of this embodiment, the biasing force exerted by the prestressed springs 4 attached to the holder 2 acts to bring the cartridge 5 into the state where it is held and pressed between the reference surfaces 7a of the support members 7 and the upper inner wall surface 2b of the holder 2 as shown in FIG. 2, thereby correcting deformation of the cartridge. In consequence, the cartridge 5 can be surely kept out of contact with the optical disc 6 encased therein and set on the disc driving spindle motor 3, thus making it possible to make the disc type recording medium rotate smoothly regardless of the deformation of the cartridge while the disc type recording medium is encased in the cartridge.

Subsequently, the optical disc 6 is rotated at the desired speed by the disc driving spindle motor 3 while the optical head 8 is moved by the head driving motor 9 to the position corresponding to the desired radial position (track) of the optical disc 6, thereby enabling information to be recorded on and/or reproduced from and, if necessary, erased from the optical disc 6. In the present embodiment, the optical disc 6 can be surely kept out of contact with the cartridge 5 at the loading position even if the cartridge is deformed and, therefore, it is possible to make the disc type recording medium rotate smoothly without being affected by the deformation of the cartridge while the disc type recording medium is encased in the cartridge. This contributes not only to avoidance of damage and generation of foreign matter due to contact of the optical disc 6 with the cartridge 5 during rotation but also to the constant load of the optical disc 6 during rotation. In consequence, it is possible to smoothly effect operations of recording, reproducing and erasing the information on and from the optical disc 6 using the optical head 8.

Figure 3:
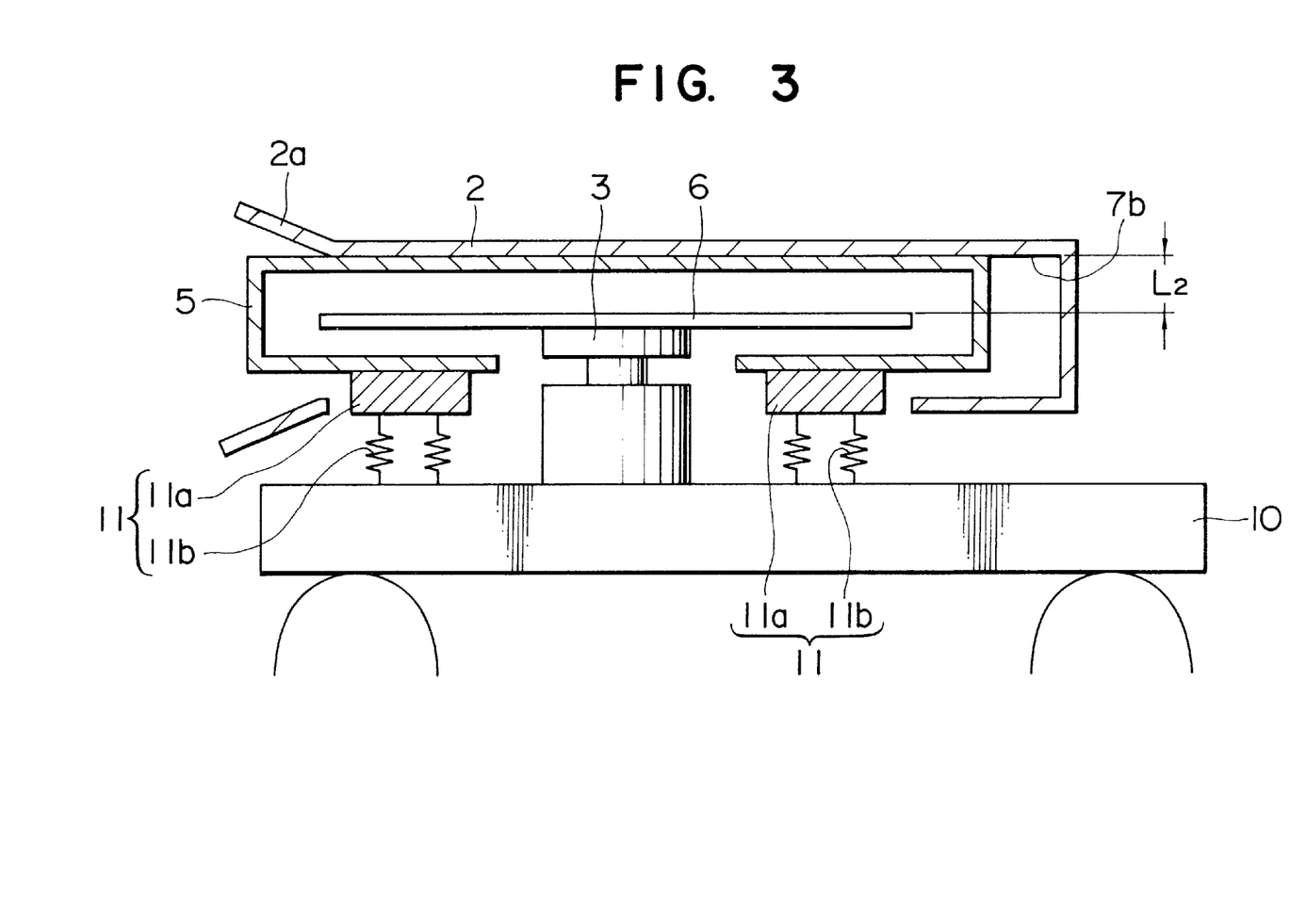
FIG. 3 is a schematic sectional view showing a construction of an apparatus for a disc type medium according to another embodiment of the present invention.

Next, description will be given of an optical disc drive according to another embodiment of the present invention with reference to FIG. 3. The embodiment shown in FIG. 3 differs from the embodiment shown in FIG. 1 in that a reference surface 7b is provided on the upper inner wall portion of the holder 2 and prestress mechanisms 11 each consisting of a movable block 11a and prestressed springs 11b are disposed on the base 10 on which the disc driving spindle motor 3 is mounted. In other words, the height of the reference surface 7b of the holder 2 in the loading state is so determined as to ensure a prescribed distance $L_2$ between the reference surface 7b and the optical disc 6 set on the disc driving spindle motor 3. In this location, the cartridge 5 is held and pressed between the reference surface 7b of the holder 2 and the movable blocks 11a of the prestress mechanisms 11 so that deformation is corrected, and hence both sides of the optical disc 6 can be surely kept out of contact with the inner wall surface of the cartridge 5.

In consequence, in the case of this embodiment as well, the rotating optical disc 6 can be surely kept out of contact with the cartridge 5, thereby making it possible to smoothly effect operations of recording, reproducing and erasing the information on and from the optical disc 6 by means of the optical head 8.

Figure 4:
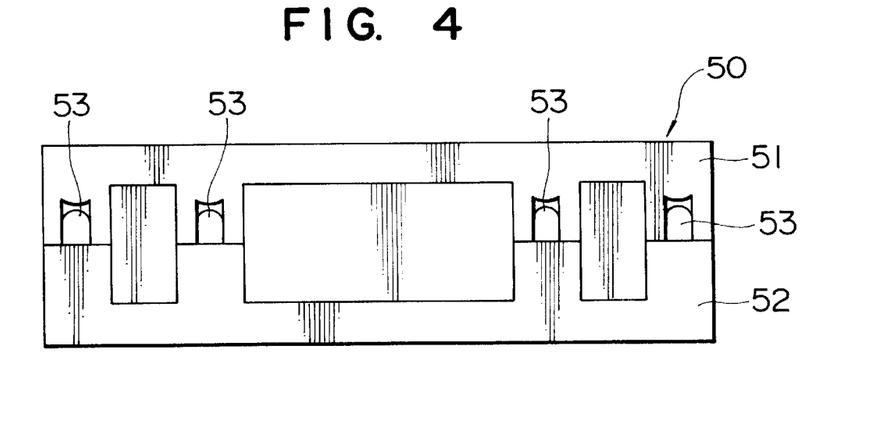
FIG. 4 is a schematic side view showing a part of a cartridge which constitutes a recording medium according to an embodiment of the present invention.
Figure 5:
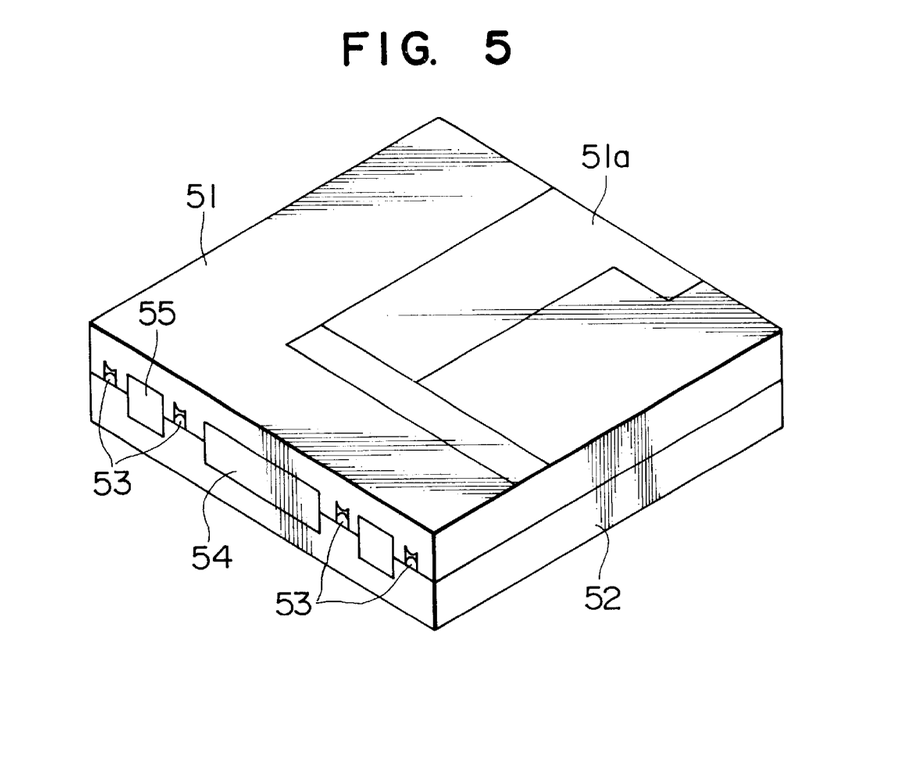
FIG. 5 is an outside perspective view of the same cartridge.

FIG. 4 is a schematic side view showing a part of a cartridge which constitutes a disc cartridge apparatus according to an embodiment of the present invention, and FIG. 5 is a perspective view showing the same cartridge.

In this embodiment, a cartridge 50 in which a disc type medium is to be encased is formed by combining a pair of frame members 51 and 52 having guide members 54 and 55, respectively, each frame member having a concave cross-section, and the frame members 51 and 52 being joined together by means of fit structures 53. Further, the frame members 51 and 52 constituting the principle part of the cartridge 50 are made of a material having high flexibility such as polyacetal, in place of a material having high stiffness, such as a polycarbonate, which is conventional. Within a space formed by the frame members 51 and 52 thus joined, the optical disc 6 is encased for free rotation although not so illustrated. In addition, at least one frame member 51 is provided with a shutter 51a which is to be opened on the occasion of the aforementioned loading operation to allow the optical disc 6 to be set on the disc driving spindle motor 3.

Figure 6A:
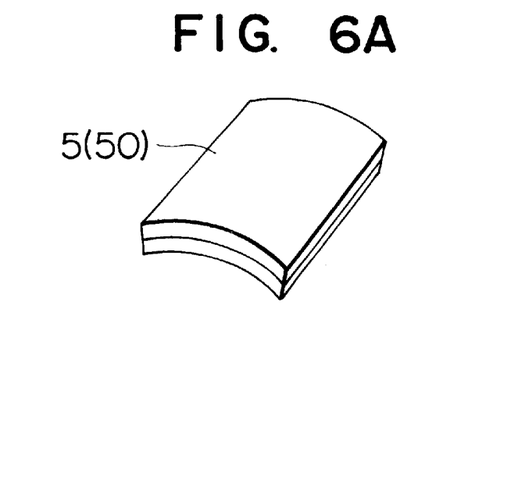
FIGS. 6A, 6B, 6C are perspective views illustrating examples deformation of the cartridge.
Figure 6B:
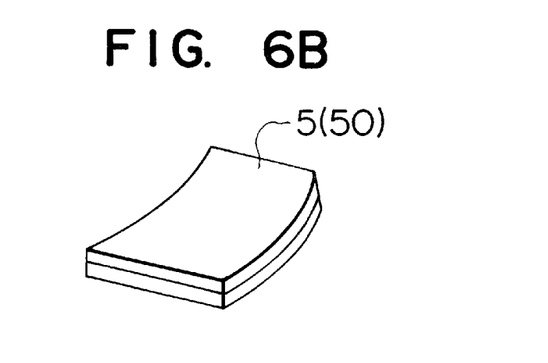
Figure 6C:
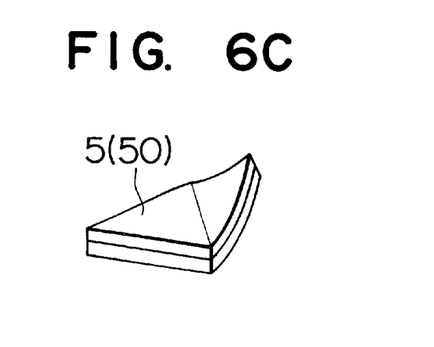

In this embodiment, since the frame members 51 and 52 are joined together through the fit structures 53, the increase of flexibility must be taken into consideration as compared with the case that they are fixed to each other by means of screwing. Namely, there are some cases that the cartridge 50 is bent or deformed as shown in FIGS. 6A, 6B, and 6C in accordance with an environmental factor such as temperature. However, the overall thickness thereof can be controlled to be in a certain range with relatively high accuracy. On the other hand, if the cartridge 50 is wholly constructed by means of screwing, the stiffness thereof becomes too high to correct for deformation. Thus, in the case of this embodiment, since the cartridge 50 is made of a material having relatively high flexibility, such as a polyacetal and is constructed by means of the fit structures 53, the overall flexibility is increased. In consequence, the shape of the cartridge 50 can be easily corrected by a relatively small correcting force when it is loaded in the optical disc drive for operation.

This invention has been described with reference to the preferred and alternate embodiments. Obviously, modifications and alternatives will occur to those of ordinary skill in the art upon reading and understanding the present invention. It is intended that the invention be construed as including all such modifications and alternatives insofar as they come with the scope of the appended claims or the equivalent thereof.

We claim:

1. An apparatus for a disc type medium, comprising:
   a cartridge holder for supporting a disc type medium;
   support means including a reference surface for contacting a first main surface of said cartridge;
   biasing means for urging the cartridge holder to contact a second main surface of said cartridge so as to apply a pressing force to the second main surface of said cartridge;
   driving means for rotating said disc type medium in said cartridge while said biasing means applies the pressing force to the second main surface;
   wherein said biasing means applies the pressing force to hold and press together said first and second main surfaces relative to each other due to said pressing force; and
   head means movable in the radial direction of said disc type medium for recording/reproducing information on/from said disc type medium while said disc type medium is rotated by said driving means;
   wherein said biasing means comprises a movable member with which said first main surface of said cartridge is brought into contact and a spring member for pressing said movable member against the first main surface, so that, due to force exerted by said spring member, said cartridge is held and pressed between said movable member and an inner wall surface of said cartridge holder which serves as said reference surface.

2. An apparatus for a disc type medium, comprising:
   a cartridge holder for supporting a disc type medium;
   support means including a reference surface for contacting a first main surface of said cartridge;
   biasing means for urging the cartridge holder to contact a second main surface of said cartridge so as to apply a pressing force to the second main surface of said cartridge;
   driving means for rotating said disc type medium in said cartridge while said biasing means applies the pressing force to the second main surface;
   wherein said biasing means applies the pressing force to hold and press together said first and second main surfaces relative to each other due to said pressing force; and
   head means movable in the radial direction of said disc type medium for recording/reproducing information on/from said disc type medium while said disc type medium is rotated by said driving means;

wherein said cartridge holder has an inner wall surface that is planar and sufficiently extensive to contact a major portion of the second main surface under the pressing force applied by the biasing means.

3. An apparatus for a disc type medium, comprising:

a cartridge;

a cartridge holder for supporting a disc type medium;

support means including a reference surface for contacting a first main surface of said cartridge;

biasing means for urging the cartridge holder to contact a second main surface of said cartridge so as to apply a pressing force to the second main surface of said cartridge;

driving means for rotating said disc type medium in said cartridge while said biasing means applies the pressing force to the second main surface;

wherein said biasing means applies the pressing force to hold and press together said first and second main surfaces relative to each other due to said pressing force; and head means movable in the radial direction of said disc type medium for recording/reproducing information on/from said disc type medium while said disc type medium is rotated by said driving means;

wherein said biasing means applies the pressing force sufficiently to undeform at least one of the first and second main surfaces to ensure operating clearance between the disc-type medium and the cartridge while the disc-type medium is rotated by said driving means.

* * * * *

UNITED STATES PATENT AND TRADEMARK OFFICE
CERTIFICATE OF CORRECTION

PATENT NO. : 6,320,836 B1
DATED : November 20, 2001
INVENTOR(S) : T. Hattori et al.

It is certified that error appears in the above-identified patent and that said Letters Patent is hereby corrected as shown below:

Columns 6, 7 and 8,
Delete all claims and insert the following claims:

1. An apparatus for a disc type medium, comprising:

a cartridge holder for supporting a disc type medium;

support means including a reference surface for contacting a first main surface of said cartridge;

biasing means for urging the cartridge holder to contact a second main surface of said cartridge so as to apply a pressing force to the second main surface of said cartridge;

driving means for rotating said disc type medium in said cartridge while said biasing means applies the pressing force to the second main surface;

wherein said biasing means applies the pressing force to hold and press together said first and second main surfaces relative to each other due to said pressing force; and head means movable in the radial direction of said disc type medium for recording/reproducing information on/from said disc type medium while said disc type medium is rotated by said driving means;

wherein said biasing means comprises a movable member with which said first main surface of said cartridge is brought into contact and a spring member for pressing said movable member against the first main surface, so that, due to force exerted by said spring member, said cartridge is held and pressed between said movable member and an inner wall surface of said cartridge holder which serves as said reference surface.

2. An apparatus for a disc type medium in which the disc type medium is rotated while supported in a cartridge, said apparatus comprising:

a support member disposed on a base, and having a reference surface for contacting a first main surface of said cartridge; and biasing means disposed opposite to said support member, with respect to said cartridge, for pressing a second main surface of said cartridge toward said first main surface

UNITED STATES PATENT AND TRADEMARK OFFICE
CERTIFICATE OF CORRECTION

PATENT NO.    : 6,320,836 B1
DATED         : November 20, 2001
INVENTOR(S)   : T. Hattori et al.

It is certified that error appears in the above-identified patent and that said Letters Patent is hereby corrected as shown below:

with sufficient pressing force to undeform at least one of the first and second main surfaces.

3. An apparatus for a disc type medium according to claim 2, further comprising a cartridge holder for supporting said cartridge during disposition and removal of said cartridge, and a driving mechanism by which said disc type medium is rotated, wherein said support member and said driving mechanism are both fixed to said base.

4. An apparatus for a disc type medium according to claim 2, further comprising a holder, on which said support member is provided, for supporting said cartridge during disposition and removal of said cartridge from said apparatus, and a driving mechanism by which said disc type medium is rotated, wherein said biasing means and said driving mechanism are disposed on said base.

5. An apparatus for a disc type medium according to claim 2, further comprising said cartridge.

6. An apparatus for a disc type medium according to claim 5, wherein the cartridge is an optical disc cartridge, and the disc type medium is an optical disc.

7. An apparatus for a disc type medium, comprising:
a housing having an opening for receiving a cartridge containing a disc type medium;
a cartridge holder contained in the housing and having first and second substantially parallel walls defining a reception port for receiving the cartridge into the cartridge holder via the housing opening, wherein the first wall includes first and second apertures;
a base contained in the housing;
drive means contained in the housing, including a driving spindle that extends through the first aperture when the cartridge is located at a loaded position within the housing, for rotating the disc type medium within the cartridge;

UNITED STATES PATENT AND TRADEMARK OFFICE
CERTIFICATE OF CORRECTION

PATENT NO. : 6,320,836 B1
DATED : November 20, 2001
INVENTOR(S) : T. Hattori et al.

It is certified that error appears in the above-identified patent and that said Letters Patent is hereby corrected as shown below:

```
        a first support member operably joined to the base
and arranged to extend through the second aperture when the
received cartridge is located at the loaded position; and
        biasing means for urging the cartridge and the first
support member together when the cartridge is at the loaded
position so that a first main surface of the cartridge is
pressed against the first support member and a second main
surface of the cartridge is pressed against an inner wall
surface of the second wall of the cartridge holder to undeform
the cartridge to prevent the cartridge from interfering with
rotation of the disc type medium by the drive means.

8.  An apparatus as claimed in claim 7, wherein the
biasing means includes a spring joining the cartridge holder
and the base for urging the cartridge holder and the received
cartridge toward the first support member.

9.  An apparatus as claimed in claim 8, wherein a spring
constant of the spring is sufficiently great to ensure that the cartridge does not interfere with rotation of the disc
type medium by the drive means.

10.  An apparatus as claimed in claim 7, wherein the
biasing means includes a first spring joining the first
support member and the base for urging the first support
member toward the cartridge.

11.  An apparatus as claimed in claim 10, wherein a
spring constant of the spring is sufficiently great to ensure
that the cartridge does not interfere with rotation of the
disc type medium by the drive means.

12.  An apparatus as claimed in claim 10, wherein the
first wall of the holder has a third aperture; the apparatus
further comprises a second support member operably joined to
the base and arranged to extend through the third aperture
when the received cartridge is located at the loaded position;
and wherein the biasing means further includes a second spring
```

UNITED STATES PATENT AND TRADEMARK OFFICE
CERTIFICATE OF CORRECTION

PATENT NO. : 6,320,836 B1
DATED : November 20, 2001
INVENTOR(S) : T. Hattori et al.

It is certified that error appears in the above-identified patent and that said Letters Patent is hereby corrected as shown below:

joining the second support member and the base for urging the second support member toward the cartridge.

13. An apparatus as claimed in claim 12, wherein an effective spring constant of the first and second springs is sufficiently great to ensure that the cartridge does not interfere with rotation of the disc type medium by the drive means.

14. An apparatus as claimed in claim 7, wherein the first wall of the cartridge holder has a third aperture; the apparatus further comprises a second support member operably joined to the base and arranged to extend through the third aperture when the received cartridge is located at the loaded position; and wherein the biasing means urges the cartridge and the first and second support members together when the cartridge is at the loaded position so that the first main surface of the cartridge is pressed against the first and second support members.

15. An apparatus as claimed in claim 7, further comprising said cartridge.

16. An apparatus for a disc type medium according to claim 15, wherein the cartridge is an optical disc cartridge, and the disc type medium is an optical disc.

17. An apparatus as claimed in claim 7, wherein said inner wall surface of the second wall of the cartridge holder is planar and sufficiently extensive to contact a major portion of the second main surface under the pressing force applied by the biasing means.

18. An apparatus for a disc type medium, comprising:
 a cartridge holder for supporting a disc type medium;
 support means including a reference surface for contacting a first main surface of said cartridge;

UNITED STATES PATENT AND TRADEMARK OFFICE
CERTIFICATE OF CORRECTION

PATENT NO.     : 6,320,836 B1
DATED          : November 20, 2001
INVENTOR(S)    : T. Hattori et al.

It is certified that error appears in the above-identified patent and that said Letters Patent is hereby corrected as shown below:

```
            biasing means for urging the cartridge holder to
   contact a second main surface of said cartridge so as to apply
   a pressing force to the second main surface of said cartridge;
            driving means for rotating said disc type medium in
   said cartridge while said biasing means applies the pressing
   force to the second main surface;
            wherein said biasing means applies the pressing
   force to hold and press together said first and second main
   surfaces relative to each other due to said pressing force;
   and
            head means movable in the radial direction of said
   disc type medium for recording/reproducing information on/from
   said disc type medium while said disc type medium is rotated
   by said driving means;
            wherein said cartridge holder has an inner wall
   surface that is planar and sufficiently extensive to contact a
   major portion of the second main surface under the pressing
   force applied by the biasing means.
```

19. An apparatus for a disc type medium, comprising:

```
            a cartridge;
            a cartridge holder for supporting a disc type
   medium;
            support means including a reference surface for
   contacting a first main surface of said cartridge;
            biasing means for urging the cartridge holder to
   contact a second main surface of said cartridge so as to apply
   a pressing force to the second main surface of said cartridge;
            driving means for rotating said disc type medium in
   said cartridge while said biasing means applies the pressing
   force to the second main surface;
            wherein said biasing means applies the pressing
   force to hold and press together said first and second main
   surfaces relative to each other due to said pressing force;
   and
            head means movable in the radial direction of said
   disc type medium for recording/reproducing information on/from
   said disc type medium while said disc type medium is rotated
   by said driving means;
```

UNITED STATES PATENT AND TRADEMARK OFFICE
CERTIFICATE OF CORRECTION

PATENT NO. : 6,320,836 B1
DATED : November 20, 2001
INVENTOR(S) : T. Hattori et al.

It is certified that error appears in the above-identified patent and that said Letters Patent is hereby corrected as shown below:

```
        wherein said biasing means applies the pressing
force sufficiently to undeform at least one of the first and
second main surfaces to ensure operating clearance between the
disc-type medium and the cartridge while the disc-type medium
is rotated by said driving means.
```

Signed and Sealed this

Thirty-first Day of August, 2004

JON W. DUDAS
*Director of the United States Patent and Trademark Office*